United States Patent [19]

Wolf et al.

[11] Patent Number: 4,487,231

[45] Date of Patent: Dec. 11, 1984

[54] SHIRRED TUBULAR CASING AND APPARATUS INCLUDING SHIRRING MEMBER FOR ITS MANUFACTURE

[75] Inventors: Hans Wolf, Ingelheim; Richard Lenhart, Wiesbaden, both of Fed. Rep. of Germany

[73] Assignee: Hoechst Aktiengesellschaft, Frankfurt am Main, Fed. Rep. of Germany

[21] Appl. No.: 520,540

[22] Filed: Aug. 5, 1983

[30] Foreign Application Priority Data

Aug. 14, 1982 [DE] Fed. Rep. of Germany ....... 3230358

[51] Int. Cl.$^3$ .............................................. F16L 11/10
[52] U.S. Cl. ................................................. 138/118.1
[58] Field of Search ..................... 138/118.1; 426/105, 426/135, 138; 206/802; 383/70, 120

[56] References Cited

U.S. PATENT DOCUMENTS

| 3,271,168 | 9/1966 | Alsys .................................. 206/802 |
| 3,907,003 | 9/1975 | Regner et al. .................. 138/118.1 |
| 4,185,358 | 1/1980 | Regner et al. ......................... 17/42 |
| 4,325,413 | 4/1982 | Lenhart et al. .................... 138/109 |

Primary Examiner—John W. Shepperd
Attorney, Agent, or Firm—Schwartz, Jeffery, Schwaab, Mack, Blumenthal & Koch

[57] ABSTRACT

Disclosed is a shirred tubular casing comprising an outwardly pointing helical main fold structure comprising windings of two main folds and primary accessory folds arranged between the main folds and an accessory fold structure comprising secondary accessory folds. Also disclosed is an annular shirring member and an apparatus equipped with this shirring member for manufacturing the shirred tubular casing.

6 Claims, 7 Drawing Figures

SHIRRED TUBULAR CASING AND APPARATUS INCLUDING SHIRRING MEMBER FOR ITS MANUFACTURE

BACKGROUND OF THE INVENTION

The present invention relates to a shirred tubular casing having both a main fold and accessory fold structure, to a shirring member used for manufacturing the shirred tubular casing, and to an apparatus which includes the shirring member for manufacturing the shirred casing.

A shirred tubular casing, also referred to as shirred stick, of this general type is disclosed in U.S. Pat. No. 3,907,003. Similarly, a shirring member and an apparatus equipped with this shirring member are known from U.S. Pat. No. 4,185,358. The previously disclosed shirred stick is very densely shirred, which is an advantage in view of its resistance to bending, but may prove a severe disadvantage when soaking the shirred stick in water prior to the filling operation. It is, for example, necessary to soak these shirred sticks for extended time periods; however, the extended soakings may result in the sticks absorbing water non-uniformly. These disadvantages occur, above all, in tubular casings comprising fiber-reinforced regenerated cellulose.

SUMMARY OF THE INVENTION

It is therefore an object of the present invention to provide a shirred tubular casing having better soaking properties, i.e. the shirred tubular casing should be capable of absorbing a sufficient and evenly distributed quantity of water, in a far shorter period of time.

Another object of the present invention is to provide a shirring member for use in the production of a shirred casing as described immediately above.

Yet another object of the present invention is to provide an apparatus including shirring member for providing a shirred casing as described above.

In accomplishing the foregoing objects, there has been provided in accordance with one aspect of the present invention, a shirred tubular casing, comprising a main fold structure comprising a series of windings, each winding including two helically extending, outwardly pointing main folds in proximate relation to one another and having a height H measured as one-half of the difference between the outside and inside diameters of the casing, a first interspace between said two main folds, defining first fold pockets therebetween, said first fold pockets having a depth less than the height H, a second interspace between successive windings of said main fold structure, having a width equal to or greater than said first interspace and defining second fold pockets therebetween, said second fold pockets having a depth substantially equal to H, a plurality of outwardly pointing primary accessory folds in said first interspace, and a plurality of secondary accessory folds in said second interspace forming an irregular zigzag line, wherein the surfaces of the shirred casing extending from said outwardly pointing main folds and from said accessory folds in the direction of the inner circumference extend at substantially right angles to the longitudinal axis of the shirred casing.

In accordance with another aspect of the present invention there is provided a shirring member for manufacturing a shirred tubular casing, comprising a sleeve-shaped annular element which includes a cylindrical inner wall, and a helically wound projection extending from the inner wall having a surface which extends perpendicularly to the longitudinal axis of the annular element and is in alignment with the adjoining outer surface of the opening of the annular element, wherein the annular element encloses and can be rotated about the casing.

In accordance with yet another aspect of the present invention, there is provided an apparatus for manufacturing a shirred tubular casing, comprising means for transporting a tubular casing along its longitudinal axis, a mandrel on which the casing is shirred and compressed, means for shirring the casing arranged around the mandrel including a sleeve-shaped annular element as described above and abutment means positioned downstream of the shirring means for contacting the tubular casing in the longitudinal direction.

The shirred stick of the present invention is ready for filling in less time, absorbs water uniformly upon soaking, and results in sausages which have a constant filling diameter.

Further objects, features and advantages of the present invention will become apparent from the detailed description of preferred embodiments which follows, when considered in light of the attached figures of the drawing.

BRIEF DESCRIPTION OF THE DRAWINGS

The invention is explained in detail with reference to FIGS. 1 to 6 which follow.

In the drawings.

DETAILED DESCRIPTION OF PREFERRED EMBODIMENTS

Figure 1:
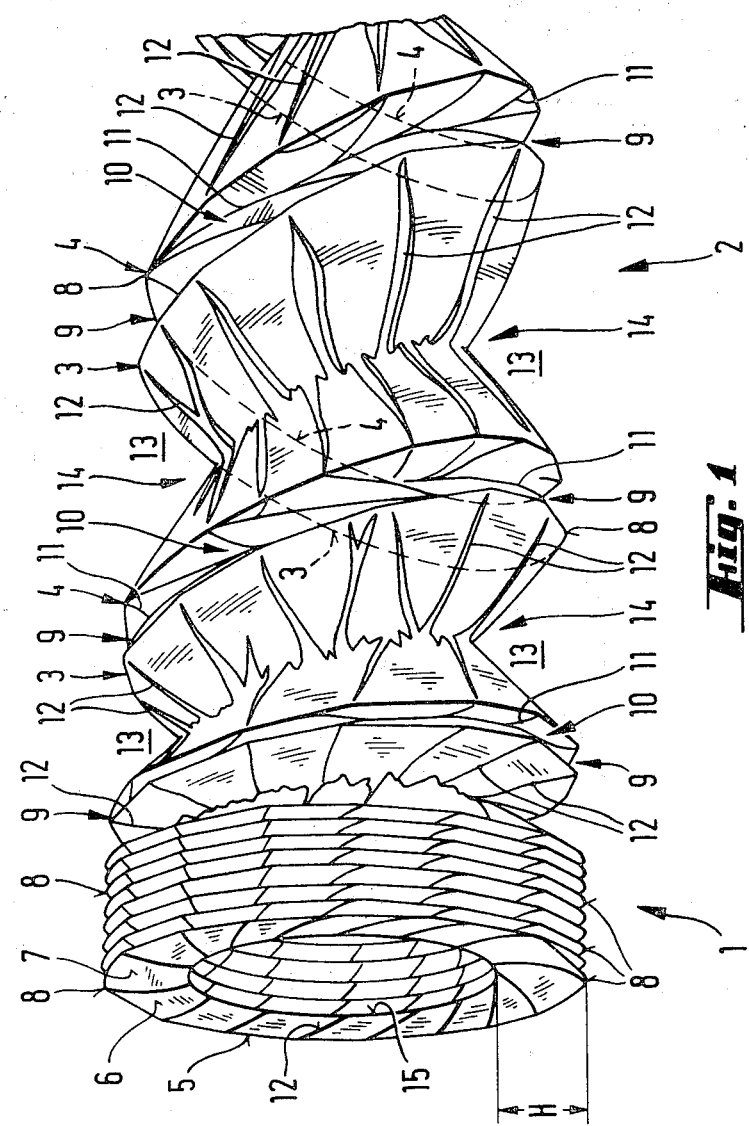
FIG. 1 is a perspective view of a shirred tubular casing according to the present invention, showing part of the casing in the deshirred state.

Compared with the prior art shirred stick which has a single main fold in the form of a uniform helical winding, the shirred tubular casing according to the present invention has two main folds, the helical course of which, in each case, does not represent a uniform helix, but is a helix which is composed of individual sections in the form of circular segments. Within one helix, the helical lines of the two main folds are repeatedly superimposed with lines in the form of the circular segments. When the shirred casing is extended, a first interspace which takes a spiral course, appears between the two main folds. The second interspace, which is present between two successive turns of this first interspace has the same width or is wider than the first interspace and also shows a spiral course. Accessory folds are present in the two interspaces.

The folds lying in the first interspace, which are referred to in the text which follows as primary accessory folds, point outwardly and form the circumference of the shirred casing, together with the main folds. For this reason and also due to the fact that the first interspace is possibly narrower than the second interspace, the pockets which are present between two primary accessory folds or between a primary accessory fold and a main fold, respectively, do not extend down to the internal space of the hollow cylinder, contrary to the pockets which are present in the second interspace, the bottoms of which form the inner circumference of the shirred casing. The primary accessory folds extend from one main fold to the directly adjoining main fold and partly intersect with other primary accessory folds or two primary accessory folds unite to form a single accessory fold. The primary accessory folds run predominantly in the circumferential direction, so that they extend almost parallel with the main folds, when the tubular casing is in the shirred state.

In the second, wider interspace, the secondary accessory fold structure shows a zigzag course of folds, when the shirred stick is in the deshirred state with some of the peaks of the zigzag line extending up to a main fold, so that, in these places of the shirred tubular casing, the secondary accessory folds come up to the outer circumference of the shirred stick. The course of the zigzag line of the secondary accessory folds, the lengths of the individual sections of the zigzag line and the angles formed in each case between two sections of the zigzag line form a completely irregular pattern.

It is an essential feature of the present invention that the casing material between the internal space of the shirred stick and the outwardly pointing folds is not arranged to be superimposed, i.e. the casing material is not inclined with respect to the longitudinal axis, but extends substantially at right angles to the longitudinal axis. The angle between the casing material and the longitudinal axis, which is indicated as "$\alpha$" in FIG. 9 of U.S. Pat. No. 3,907,003, thus varies only slightly from 90°.

The tubular casing is made of a flexible material of the type conventionally used for manufacturing shirred tubular casings, in particular shirred sausage casings. Preferably, the casing comprises regenerated cellulose with a fiber insert. This material shows a particularly good soaking behavior in the tubular casing having the fold structure according to the present invention. The tubular casing may be provided with coating layers on its outer and inner surfaces, such as are customary in sausage casings. To facilitate shirring, a lubricant may be applied to the outer or inner surface of the tubular casing, prior to or during the shirring operation.

Figure 7:
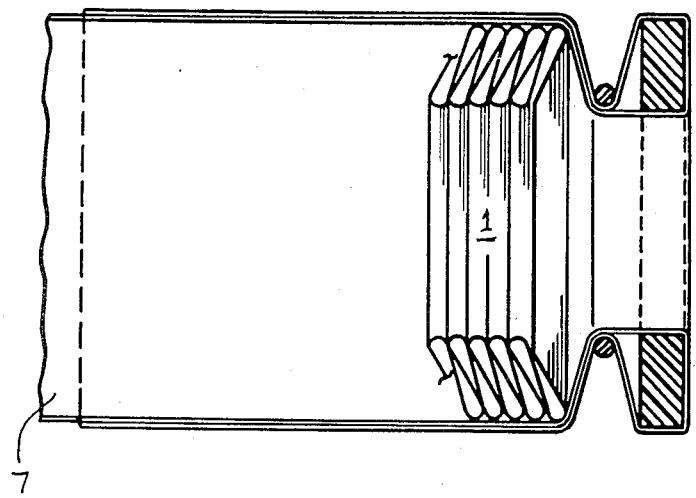
FIG. 7 is a sideview illustrating a shirred casing further including an outer jacket for increasing the rigidity of the casing.

Because of its relatively low resistance to bending, the shirred tubular casing is appropriately provided with an outer jacket, which comprises a film or a net as described in U.S. Pat. No. 4,325,413, the disclosure of which is incorporated herein by reference. FIG. 7 illustrates a shirred tubular casing 1 provided with an outer jacket 7, as disclosed in said patent.

Referring now to the drawings, in FIG. 1, the shirred tubular casing 1 is shown having an extended, but not yet completely deshirred portion 2. The main folds 3 and 4 are formed in a helical manner along the casing forming the outer circumference 5 of the tubular casing in the shirred state. Reference numerals 6 and 7 denote circular segments of a main fold, which meet to form corners 8 along the outer circumference of the shirred casing. A first interspace 9 comprising a fold pocket 10 and primary accessory folds 11 is present between the two main folds 3 and 4. A second interspace 13 is also provided having secondary accessory folds 12 and a deeper fold pocket 14 than the fold pocket 10 of the first interspace. The bottoms of the fold pockets 14 form the inner circumference 15 of the shirred tubular casing 1, when the latter is in the shirred state.

The height of fold H of the shirred tubular casing 1 corresponds to half the difference between the outside diameter and the inside diameter of the shirred stick. The inside diameter of the shirred stick is determined by the outside diameter of the shirring mandrel 24 (FIG. 6) and the outside diameter of the shirred stick is determined by the tubing diameter.

Figure 2:
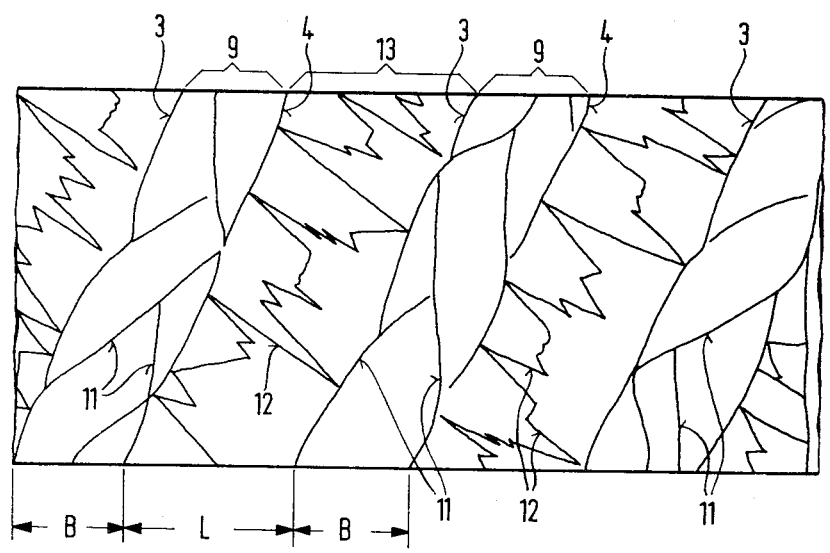
FIG. 2 illustrates the fold pattern of the tubular casing according to FIG. 1, in the completely deshirred and cut-open state.
Figure 3:
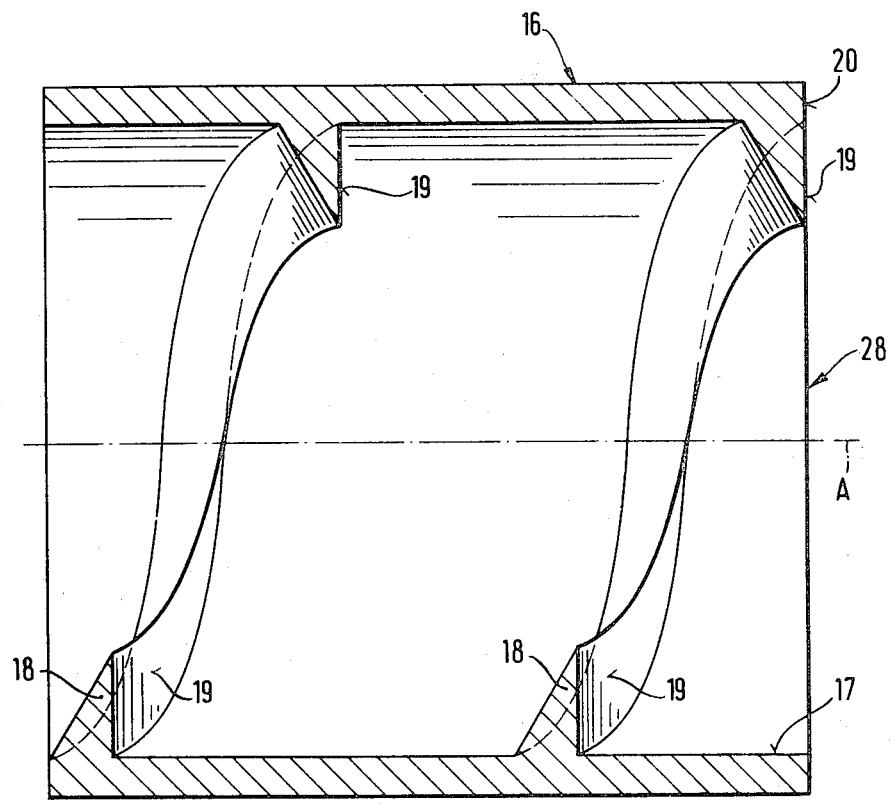
FIG. 3 is a longitudinal sectional view of the shirring member.
Figure 4:
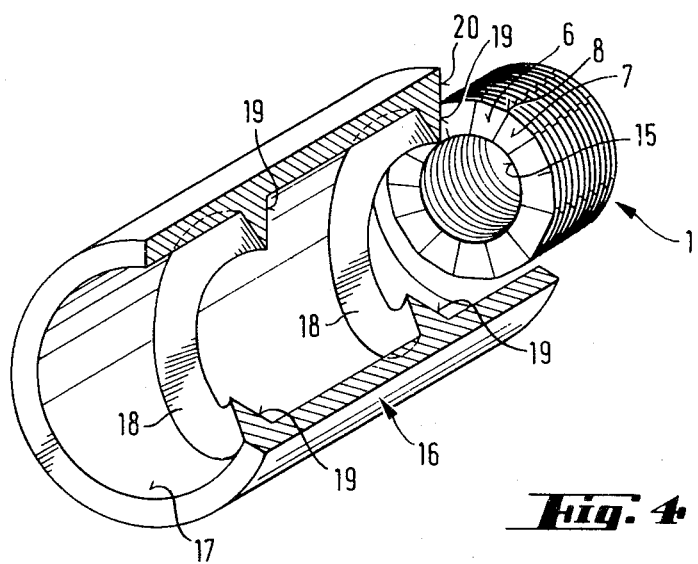
FIG. 4 is a perspective sectional view of the shirring member.
Figure 5:
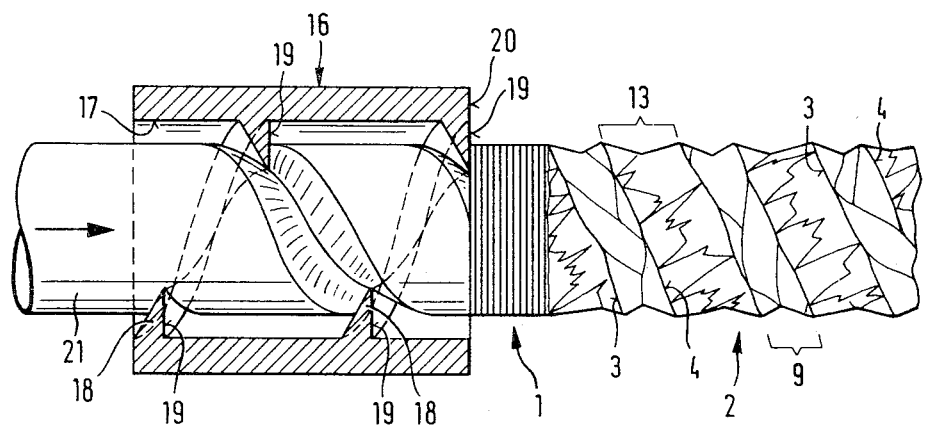
FIG. 5 is a longitudinal sectional view of the shirring member according to FIGS. 3 and 4, in the operating position.
Figure 6:
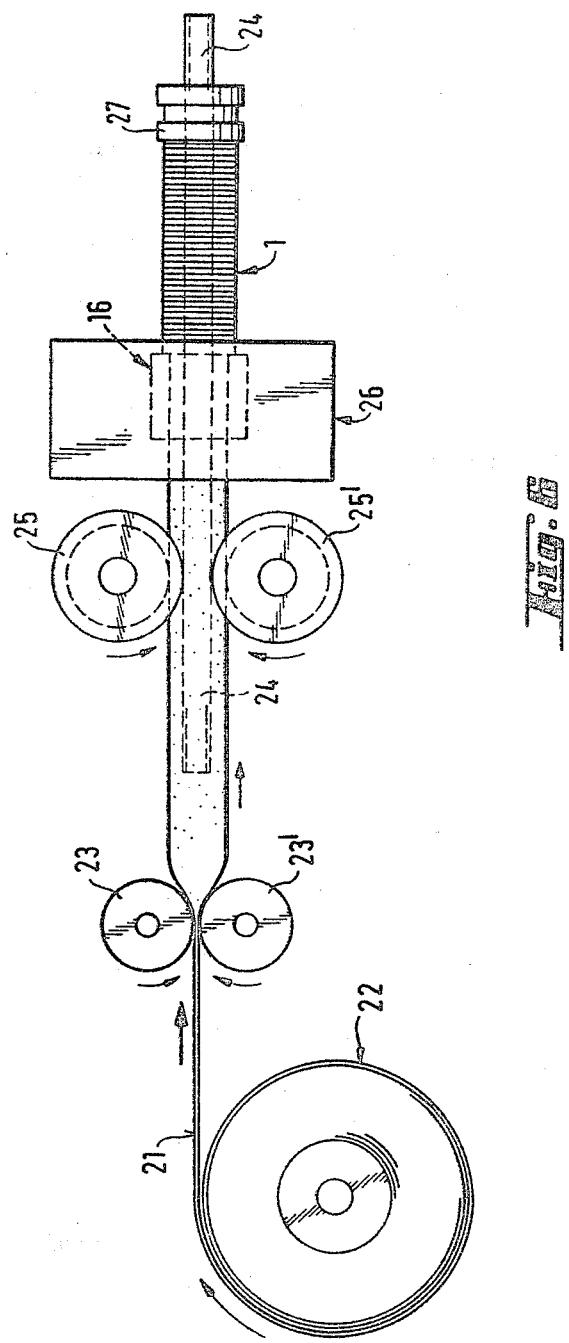
FIG. 6 is a lateral view of the apparatus equipped with the shirring member shown in FIGS. 3 to 5.

FIG. 2 shows a portion of the tubular casing according to FIG. 1, which is fully extended and cut open in the direction along its longitudinal axis. The reference numerals have the same meaning as in FIG. 1. L is the width of the second interspace 13 (FIG. 1) and corresponds to about 2.2 to 2.8 times the height of fold H which, in turn, is dependent upon the diameter of the shirring mandrel 24 (FIG. 6) and the tubing diameter. At given shirring mandrel and tubing diameters, L is thus also fixed. B is the width of the first interspace 9, which may be adjusted by changing the speed of rotation of the sleeve-shaped annular element 16 (FIGS. 3 to 5) of the shirring unit 26 (FIG. 6). At a given advance speed of the tubing, which is determined by drive members, for example, rollers 25 and 25' (FIG. 6), B increases progressively with decreasing speed of rotation of the annular element 16 (FIGS. 3 to 5). Optimally, B approaches the values of L or is equal to L.

In FIG. 3, the sleeve-shaped annular element 16 is shown in a longitudinal section. The annular element 16 has a cylindrical inner wall 17 which is provided with a helical projection 18. The surface 19 of the helical projection 18 extends at right angles to the longitudinal axis A of the shirring member 16. At the opening 28 of the shirring member 16, shown on the right-hand side in FIG. 3, the surface 19 is in alignment with the outer surface 20, which faces the shirred casing as it exits from the annular element.

In FIGS. 4 and 5, the same reference numerals as in the preceding Figures are used to denote identical parts. These figures illustrate the progression of the casing with regard to the sleeve-shaped element.

In FIG. 6, a flattened tubular casing 21 is drawn from the roll 22 and, after passing between squeeze rollers 23 and 23', is inflated and kept inflated by introducing air through the mandrel 24, in a known manner. The inflated tubular casing passes between two further driven rollers 25 and 25' which prevent any undesired twisting of the tubular casing. The casing is then densely compressed against the abutment 27, by means of the diagrammatically shown shirring unit 26 comprising the annular element 16, according to FIGS. 3 to 5, to produce the shirred tubular casing 1.

What is claimed is:

1. A shirred tubular casing, comprising:
    a main fold structure comprising a series of windings, each winding including:
        two helically extending, outwardly pointing main folds in proximate relation to one another and having a height H measured as one-half of the difference between the outside and inside diameters of the casing, a first interspace between said two main folds defining first fold pockets therebetween, said first fold pockets having a depth less than the height H, a second interspace between successive windings of said main fold structure, having a width equal to or greater than said first interspace and defining second fold pockets therebetween, said second fold pockets having a depth substantially equal to H and forming the inner circumference of the casing, and a plurality of outwardly pointing primary accessory folds in said first interspace, said primary accessory folds connecting with said main folds and interconnecting to at least some extent with one another; and a plurality of secondary accessory folds in said second interspace forming an irregular zigzag line, wherein the surfaces of the shirred casing extending from said outwardly pointing main folds and from said accessory folds in the direction of the inner circumference extend at substantially right angles to the longitudinal axis of the shirred casing.

2. A shirred tubular casing as claimed in claim 1, wherein said main folds comprise a series of abutting circular sections.

3. A shirred tubular casing as claimed in claim 1, wherein said secondary accessory folds extend from the inner circumference of the tubular casing to the outer circumference.

4. A shirred tubular casing as claimed in claim 1, wherein said casing comprises regenerated cellulose.

5. A shirred tubular casing as claimed in claim 1, wherein said regenerated cellulose casing includes a fiber reinforcement.

6. A shirred tubular casing as claimed in claim 1, further comprising an outer jacket for increasing the rigidity of the casing.

* * * * *